United States Patent
Ozawa et al.

[11] Patent Number: 5,986,639
[45] Date of Patent: Nov. 16, 1999

[54] APPARATUS AND METHOD FOR EXTENDING A REACTIVE AREA ON A DISPLAY SCREEN

[75] Inventors: Kazutaka Ozawa, Kanagawa; Satoshi Ito, Fukuoka-ken, both of Japan

[73] Assignee: Fujitsu Ltd., Kawasaki, Japan

[21] Appl. No.: 08/735,439

[22] Filed: Jan. 2, 1997

[30] Foreign Application Priority Data

Mar. 18, 1996 [JP] Japan .................................... 8-060758

[51] Int. Cl.$^6$ .................................................. G09G 5/08
[52] U.S. Cl. .......................... 345/146; 345/145; 345/157
[58] Field of Search .................................... 345/156, 157, 345/145, 146

[56] References Cited

U.S. PATENT DOCUMENTS

| | | | |
|---|---|---|---|
| 4,586,035 | 4/1986 | Baker et al. | 340/712 |
| 4,587,520 | 5/1986 | Astle | 340/712 |
| 4,698,625 | 10/1987 | McCaskill et al. | 340/709 |
| 5,243,697 | 9/1993 | Hoeber et al. | 395/156 |
| 5,298,890 | 3/1994 | Kanamaru et al. | 345/157 |
| 5,436,666 | 7/1995 | Astle | 348/416 |
| 5,488,685 | 1/1996 | Palmer et al. | 395/157 |
| 5,508,717 | 4/1996 | Miller | 345/145 |
| 5,565,888 | 10/1996 | Selker | 345/146 |

Primary Examiner—Mark R. Powell
Assistant Examiner—Vincent E. Kovalick
Attorney, Agent, or Firm—Staas & Halsey

[57] ABSTRACT

An information processing system having a screen display device and an input device with an improved operability in selecting a reactive area, i.e., an icon, on the screen using the input device. When a user clicks a mouse button with a mouse cursor positioned outside a reactive area displayed on a screen, the reactive area is extended and an extended portion is displayed. If the mouse cursor is moved into the extended portion and the mouse button is clicked, a process corresponding to the original reactive area is activated and the extended display is cancelled.

25 Claims, 16 Drawing Sheets

APPARATUS AND METHOD FOR EXTENDING A REACTIVE AREA ON A DISPLAY SCREEN

BACKGROUND OF THE INVENTION

1. Field of the Invention

The present invention relates to an information processing system having a screen display device and an input device such as a pointing device, etc., and, more specifically, to a processing device for determining a selection item selected on the screen through the input device and automatically starting a corresponding process.

2. Description of the Related Art

Known information processing systems, typically embodied on a general purpose computer, have display screens wherein it is possible to select a desired item, such as an icon or menu, from among displayed selection items by operating a pointing device. Typically, the desired item specifies a desired process. Each selection item has an associated reactive area, co-extensive with the display of the selection item, which, when selected with a pointing device, activates the selection item. A pointing device refers to an input device capable of specifying a desired position on the display screen, and can be, for example, a mouse, track ball, writing pen, touch panel, etc.

When a number of icons are displayed on the display screen, each corresponding to a respective process, the user selects one icon using a pointing device, and the information processing system performs the selected process upon receipt of the selection result. Thus, the user selects a desired process in a simple pointing operation and activates the selected process.

Various smaller information processing terminal units, such as a PDA (personal digital assistant, for example, a new personal information terminal unit), etc., have been developed for practical use. A PDA refers to a small-size portable information terminal unit having the functions of a microcomputer, display, writing pen, and communications system.

If an icon in a PDA or other small screen device becomes larger, then the number of icons that can be displayed on one screen becomes smaller. As used herein an icon is a reactive area for receiving an instruction from the pointing device. Therefore, the user has to switch the screen, to a screen with additional icons, a number of times. To avoid this, the user typically can set the icons to be displayed in smaller size. However, with smaller icons, the operation of the pointing device becomes difficult, and a selecting operation cannot be easily performed. For example, if the icons are displayed in smaller size, a lot of icons can be simultaneously displayed, but it becomes more difficult to find a desired icon on the display screen. Even if individual icons can be distinguished, the contents of each of the small icons cannot be correctly recognized. Further, individual icons may be difficult to recognize from among the other graphics displayed on the display screen. A portable terminal unit such as a PDA having a limited sized screen, only increases such problems.

SUMMARY OF THE INVENTION

Accordingly, it is an object of the present invention to provide a reactive area extending apparatus and method capable of improving the operability in a selecting operation, using an input device, by extending and displaying the reactive area on the screen.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
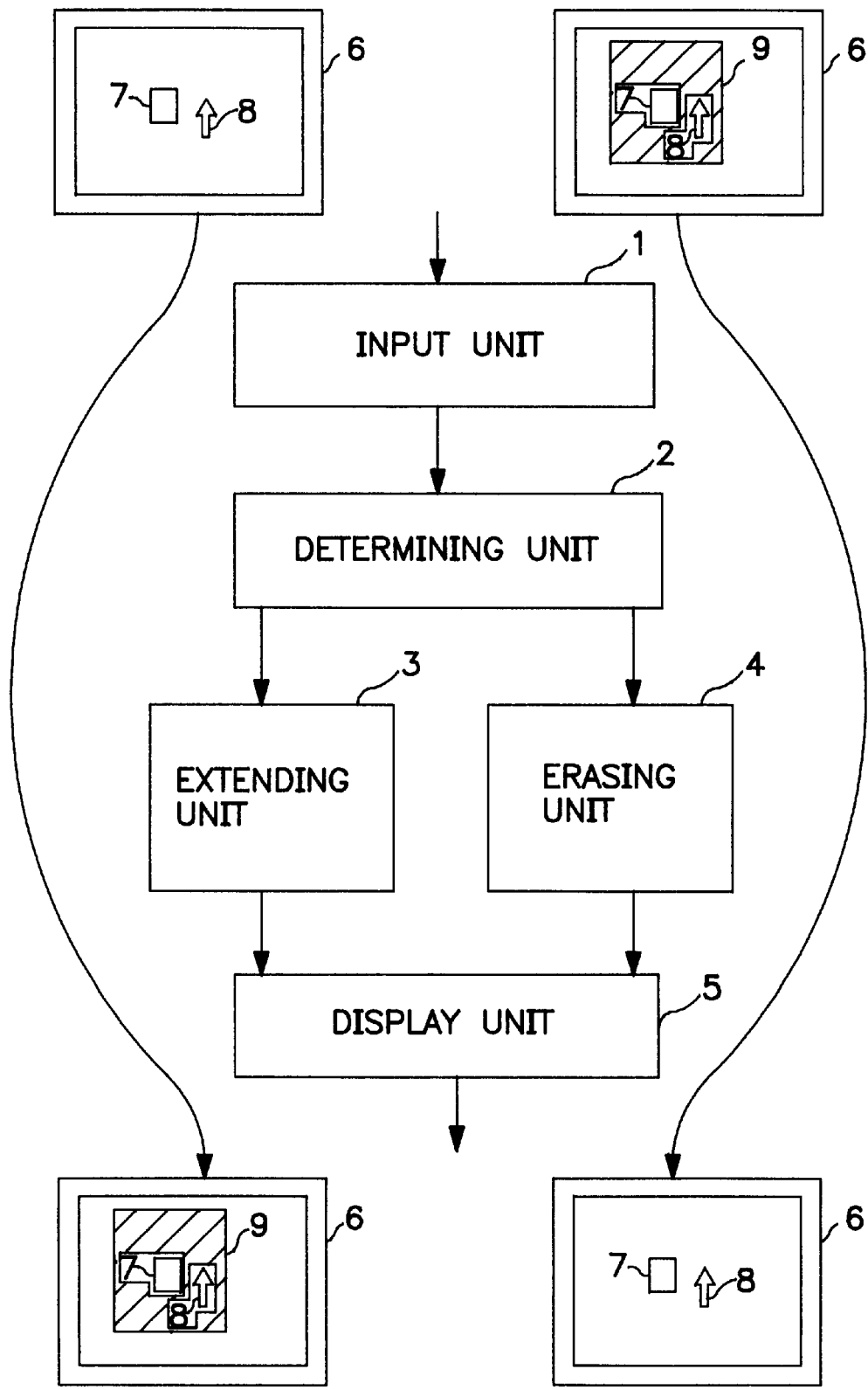
FIG. 1 is a logical diagram of the apparatus for extending a reactive area in accordance with the present invention.

Reference will now be made in detail to the present preferred embodiments of the present invention, examples of which are illustrated in the accompanying drawings, wherein like reference numerals refer to like elements throughout. The present invention can be practiced on general purpose computers or more specialized computers such as a PDA.

FIG. 1 is a logical diagram of the apparatus for extending a reactive area in accordance with the present invention. The reactive area extending apparatus shown in FIG. 1 generally comprises an input unit 1, a determining unit 2, an extending unit 3, an erasing unit 4, and a display unit 5.

The input unit 1 inputs position information relating to a position specified by the user on the screen. The determining unit 2 determines whether the specified area containing the position is a reactive area or an unreactive area. The extending unit 3 extends a designated reactive area when the specified area corresponds to the unreactive area. The display unit 5 displays on the screen the extended portion of the designated reactive area in association with the designated reactive area. The reactive area extending apparatus shown in FIG. 1 displays a plurality of selection items on the screen, and is used with an information processing apparatus for automatically performing a selected process.

The input unit 1 comprises, for example, a pointing device for receiving position information about a position specified by the user. The input unit 1 transmits the position information, for example, a coordinate value, indicating the specified position, to the determining unit 2. The determining unit 2 determines whether the specified area containing the specified position is a reactive area or an unreactive area.

A reactive area refers to an area, for example an icon, which, when selected starts a corresponding process. An unreactive area refers to a background area outside all reactive areas and not associated with any reactive area. Typically, a reactive area corresponds to one selection item, and a corresponding process is activated when a mouse button is clicked in a reactive area.

When the determining unit 2 determines that the specified area corresponds to an unreactive area, the extending unit 3 extends some or all of the reactive areas, i.e. the designated reactive areas on the screen. The display unit 5 displays the extended reactive areas of the designated reactive areas on the screen. At this time, the extended portion, which has been added to an unextended reactive area, is displayed in association with the original reactive area. When an instruction to select an extended reaction area is issued, the corresponding unextended reactive area is automatically selected. Thus, the extended area is also referred to as an optional reactive area, in that the user can optionally select, i.e. click on, the extended area to activate the process corresponding to the reactive area.

As shown by a display screen 6 on the left top of FIG. 1, the determining unit 2 determines that the specified position of the cursor 8 corresponds to an unreactive area if the position information is input when the cursor 8 is outside a rectangular reactive area 7.

The extending unit 3 extends the reactive area 7, causing the display unit 5 to display an extended reactive are 9, as shown by the display screen 6 on the left bottom in FIG. 1. In this example, the shadowed area corresponds to an extended portion, and surrounds the original reactive area 7. The boundary between the extended portion and the reactive area 7 may or may not be displayed.

Thus, extending and displaying the reactive area improves the operability of the pointing device, etc. and allows the user to easily select a specified selection item.

The erasing unit 4 erases the above described extended portion from the screen as necessary. For example, when the determining unit 2 determines the reactive area on the screen has already been extended. Specifically, when the above described position information is input after the reactive area has been extended, the display unit 5 erases the extended portion of the extended reactive area.

As shown by the display screen 6 on the right top in FIG. 1, if the position information is entered when the cursor 8 is in the extended reactive area 9, then the determining unit 2 determines that the specified position indicated by the cursor 8 corresponds to the reactive area 7. Thus, the process corresponding to the reactive area 7 is automatically activated, and the erasing unit 4 erases the extended display as shown by the display screen 6 on the right bottom of FIG. 1. As a result, the display screen 6 returns to the original state on the left top in FIG. 1, or the result of the activated process is displayed in the display screen 6.

Figure 2A:
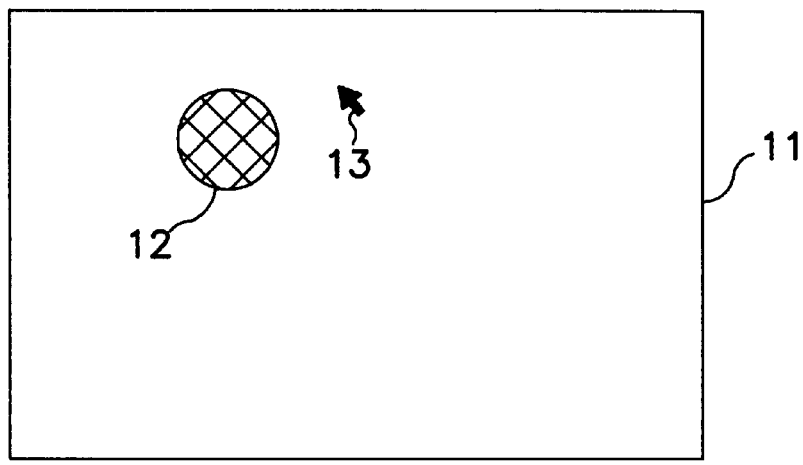
FIGS. 2A–2C are screen diagrams of a display screen in accordance with a first preferred embodiment of the present invention.
Figure 2B:
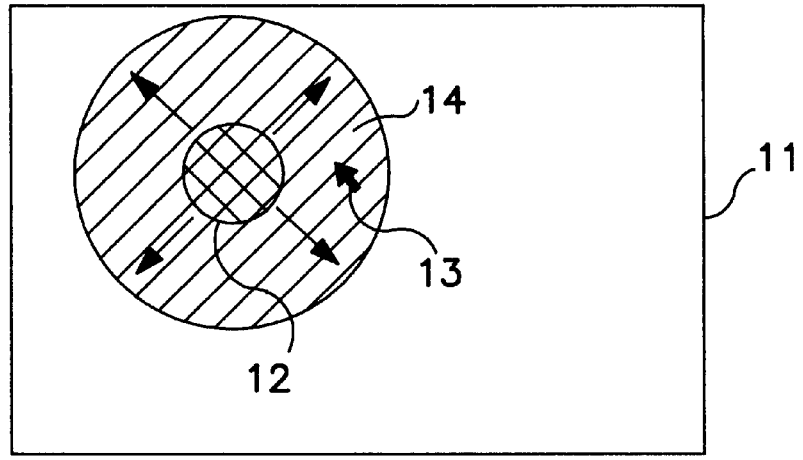
Figure 2C:
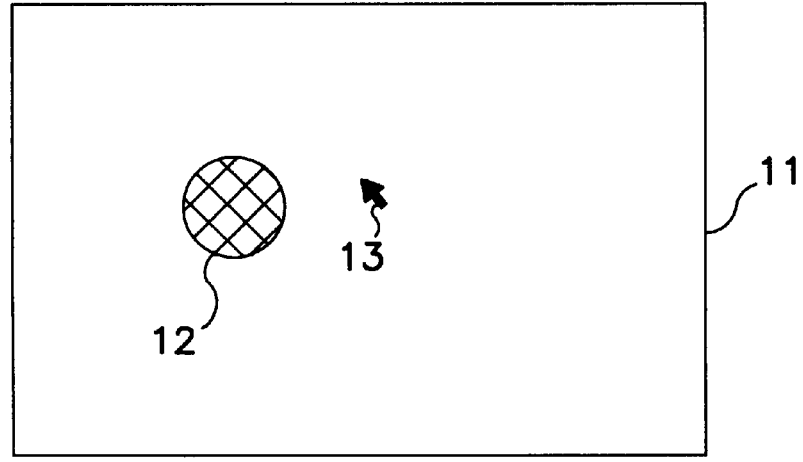

FIGS. 2A–2C are screen diagrams of a display screen in accordance with a first preferred embodiment of the present invention. In accordance with the first preferred embodiment of the present invention, the reactive areas, such as displayed icons and other graphics, are selected by clicking a mouse button. For example, the user clicks the mouse button when a mouse cursor 13 is positioned in the unreactive area (non-reactive area) outside a reactive area 12 on a screen 11, as shown in FIG. 2A. The reactive area 12 is then extended outward and the extended portion 14 is displayed as shown in FIG. 2B. If the reactive area 12 is too small to be successfully selected, the reactive area 12 is automatically extended and displayed for an easy selecting operation. Clicking the mouse button a few times at random outside the reactive area 12 extends and displays the areas.

When the mouse cursor 13 is moved into an extended portion 14 and clicked, a process corresponding to the original reactive area 12 is started and the extended portion is erased, thereby terminating the extended display, as shown in FIG. 2C. Thus, the user starts a desired process, and makes the next selection on the screen.

Figure 3:
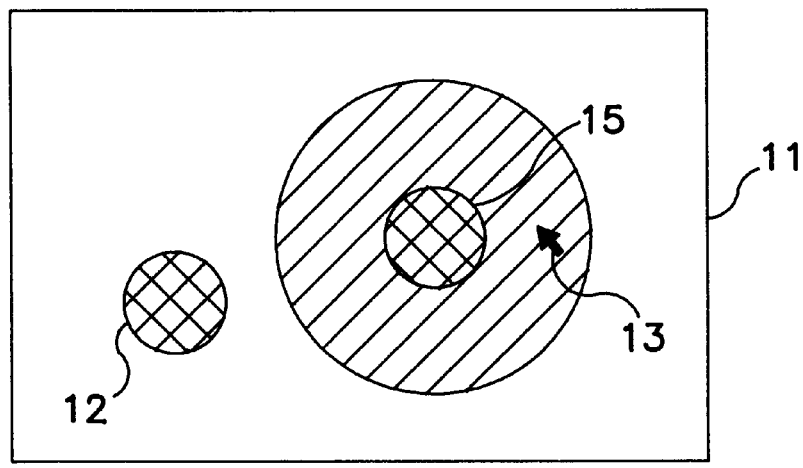
FIG. 3 is a display screen in accordance with the first preferred embodiment of the present invention.
Figure 4:
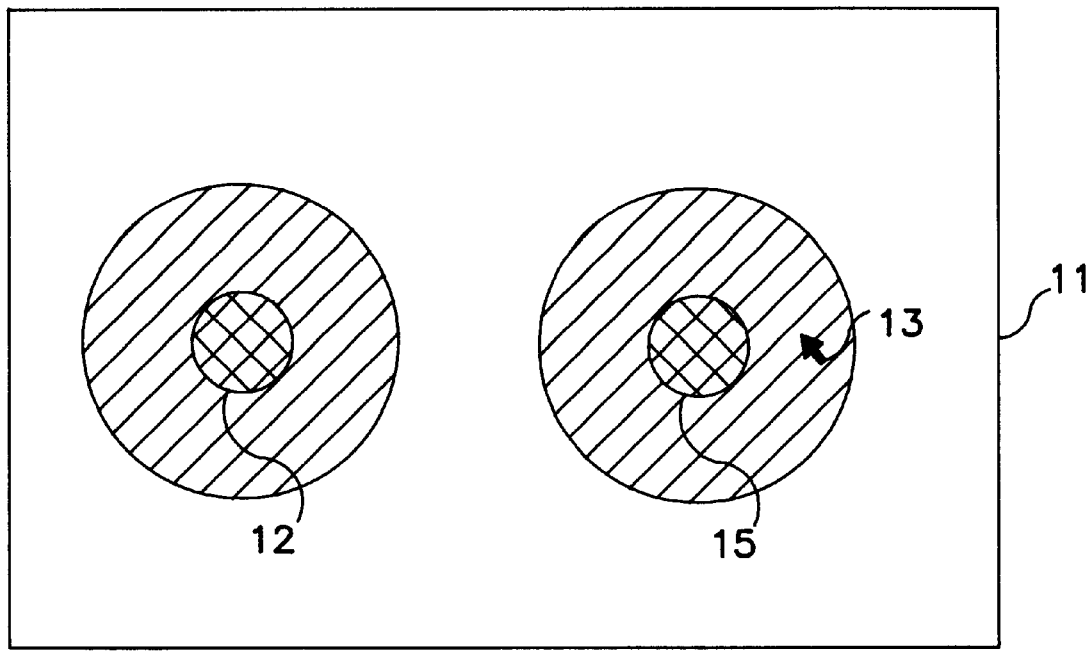
FIG. 4 is a display screen in accordance with the preferred embodiments of the present invention.

FIG. 3 is a display screen in accordance with the preferred embodiments of the present invention. FIG. 4 is a display screen in accordance with the preferred embodiments of the present invention. When two or more reactive areas are displayed on the screen 11, a reactive area to be extended can be optionally specified by the location of the mouse cursor when it is clicked. Of the two reactive areas 12 and 15 in the example shown in FIG. 3, only the reactive area closer to the mouse cursor 13, that is, the reactive area 15, is extended. In the example shown in FIG. 4, both reactive areas 12 and 15 are extended. One skilled in the art will recognize that all reactive areas on the screen or in the same window can be simultaneously extended and displayed. Furthermore, the number of reactive areas to be extended can be preliminarily designated. In this case, the reactive area extending apparatus counts the number of object reactive areas and checks whether the count value exceeds a predetermined value. The reactive area is extended within the range of the predetermined value. Thus, the number of the extended reactive areas to be displayed on the screen can be limited.

Figure 5:
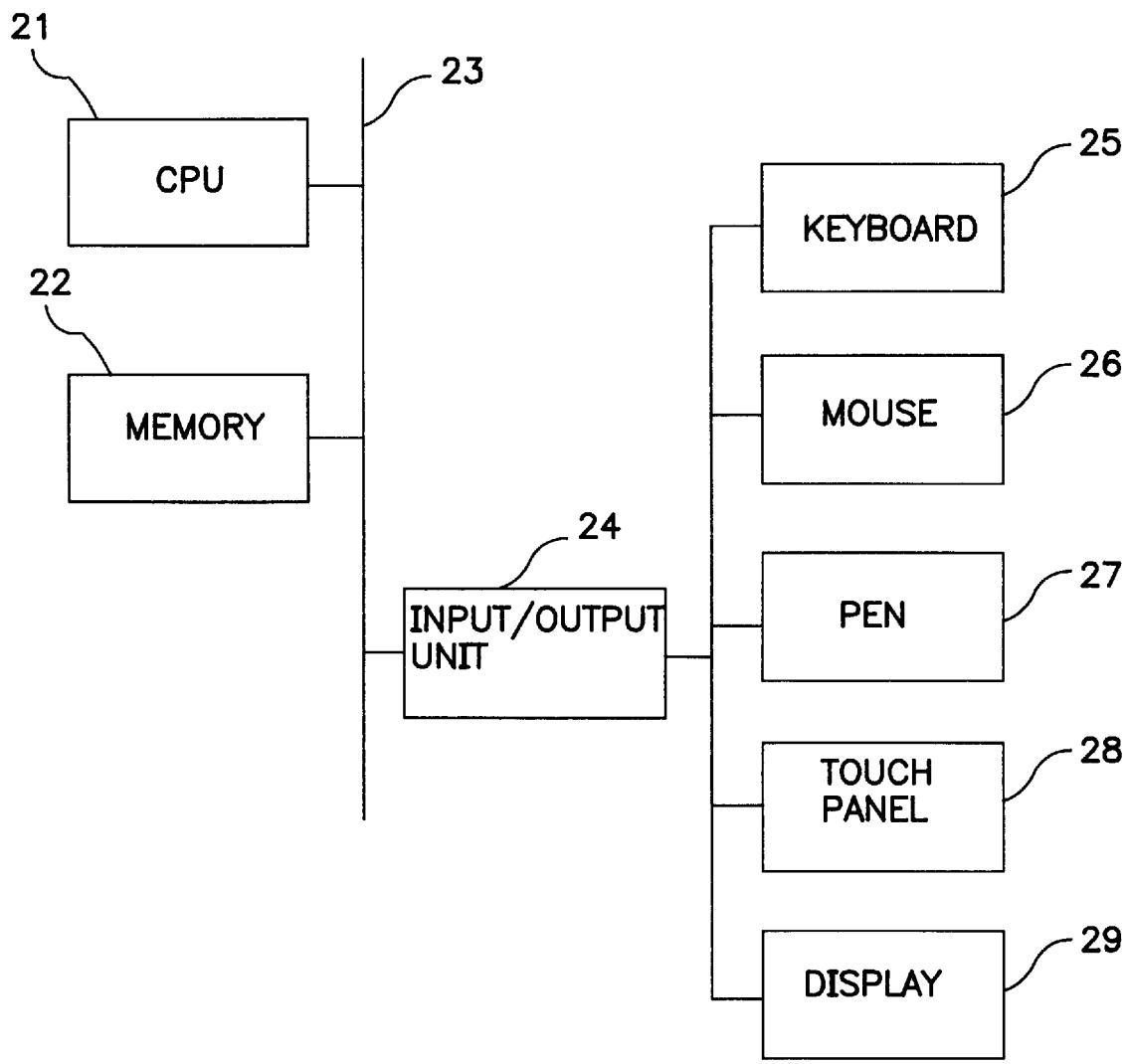
FIG. 5 is a block diagram of an apparatus for extending a reactive area in accordance with the preferred embodiments of the present invention.

FIG. 5 is a block diagram of an apparatus for extending a reactive area in accordance with the preferred embodiments of the present invention. The input unit 1 corresponds to an input/output unit 24, keyboard 25, mouse 26, writing pen 27, and touch panel 28. The determining unit 2, extending unit 3, and erasing unit 4 correspond to a CPU (central processing unit) 21 and memory 22. The display unit 5 corresponds to a display 29. A bus 23 connects the CPU 21, the memory 22, and the input/output unit 24. The keyboard 25, mouse 26, writing pen 27, touch panel 28, and display 29 are connected to the input/output unit 24.

When the reactive areas such as icons, etc. are displayed on the screen of the display 29, the user selects a reactive area using an input device, for example, the keyboard 25, the mouse 26, the writing pen 27, or the touch panel 28. The input selection instruction is transmitted to the CPU 21 through the input/output unit 24. The position information for each reactive area on the screen is stored in the memory 22.

The CPU 21 compares the position at which an input operation, for example a clicking operation, has been performed with the position of each reactive area, and determines whether a reactive area has been selected. If the position of the input operation does not correspond to any of the reactive areas, the CPU 21 instructs the input/output unit 24 to extend some or all of the reactive areas. In response to the instruction to extend reactive areas, the input/output unit 24 extends and displays the icon, etc. on the screen of the display 29. Thus, the user can easily select the reactive area on the screen. A reactive area can be selected not only by a pointing device such as a mouse, etc., but also by other input methods and devices, for example, a keyboard cursor.

Figure 6:
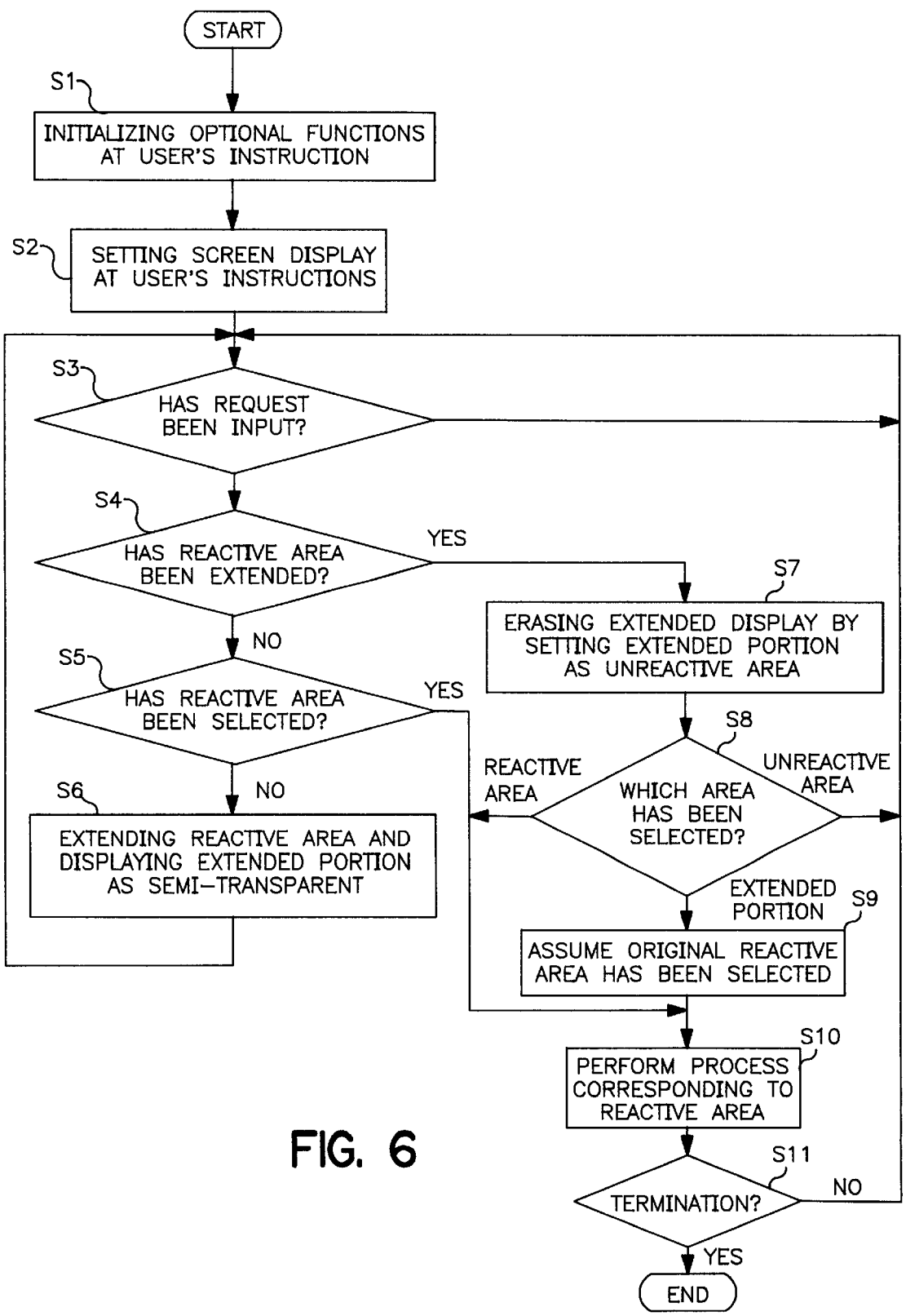
FIG. 6 is a flow chart of a selecting process in accordance with the first preferred embodiment of the present invention.

FIG. 6 is a flow chart of a selecting process in accordance with the first preferred embodiment of the present invention. As shown in FIG. 6, when the process starts, the CPU 21 initializes optional functions according to the user's instruction, and sets operational parameters including the extension size, display color in the extended window, etc. in step S1. If the initial settings are omitted, default values are used. The types and contents of the optional functions are described hereinafter.

Next, the screen display is set according to the user's instruction in step S2. For example, the user can reduce the size of the data to be displayed on the screen by ignoring the operability of the pointing device. That is, the size of the reactive area can be specified according to the requirements other than the operability of the pointing device. Thus, a number of reactive areas can be simultaneously displayed on the screen.

Then a determination is made as to whether a request has been input by the user through the pointing device in step S3. A request is input by, for example, clicking a mouse button. The system waits until a request input is made. Upon receipt of a request, it is determined whether all or a part of the reactive areas displayed on the screen have been extended in step S4.

If the reactive areas have not been extended, a determination is made in step S5 as to whether the area specified by the pointing device is a reactive area with an instruction or an unreactive area in step S5. If a reactive area has been specified, then a registered corresponding process is performed in step S10.

If, in step S5, it is determined that the selected area is an unreactive area, the CPU 21 and input/output unit 24 extend and display all or a part of the reactive areas displayed on the screen in step S6. At this time, the newly extended portion, such as the extended portion 14 shown in FIG. 2, is displayed in, for example, a semitransparent color. Then, the process returns to step S3.

If, in step S4, it is determined that the reactive area has been extended, the CPU 21 and input/output unit 24 release the extended display by setting the extended portion of the reactive area as an unreactive area in step S7. Next, in step S8, the CPU 21 determines whether the selected area specified in step S3 is the original reactive area, extended portion, or unreactive area in step S8. An unreactive area refers to an area other than the original reactive area and extended portion.

If it is determined that the selected area is the original unextended reactive area, a corresponding process is performed in step S10, as in the case where the original reactive area is selected before extension in step S10. When it is determined that the selected area is an extended portion, it is assumed that the original reactive area has been selected in step S9 and the process in step S10 is performed. If it is determined that the selected area is an unreactive area, then the processes return to step S3.

After step S10, the CPU 21 determines whether the entire process should be terminated in step S1, i.e., a termination instruction is received from the user. If no, the process returns to step S3, otherwise, the process ends.

When a large reactive area is specified by the pointing device in the first selection process, as shown in FIG. 6, the reactive area may be reduced and displayed to increase the number of reactive areas which can be simultaneously displayed on the screen. Even when there are a number of reactive areas, a requested reactive area can be easily detected by extending and displaying the reactive area. Furthermore, the first selecting process does not depend on the contents of a conventional selecting program, but can be incorporated independently of the conventional program. Therefore, an effective general-purpose process can be realized by the first selecting process.

Figure 7:
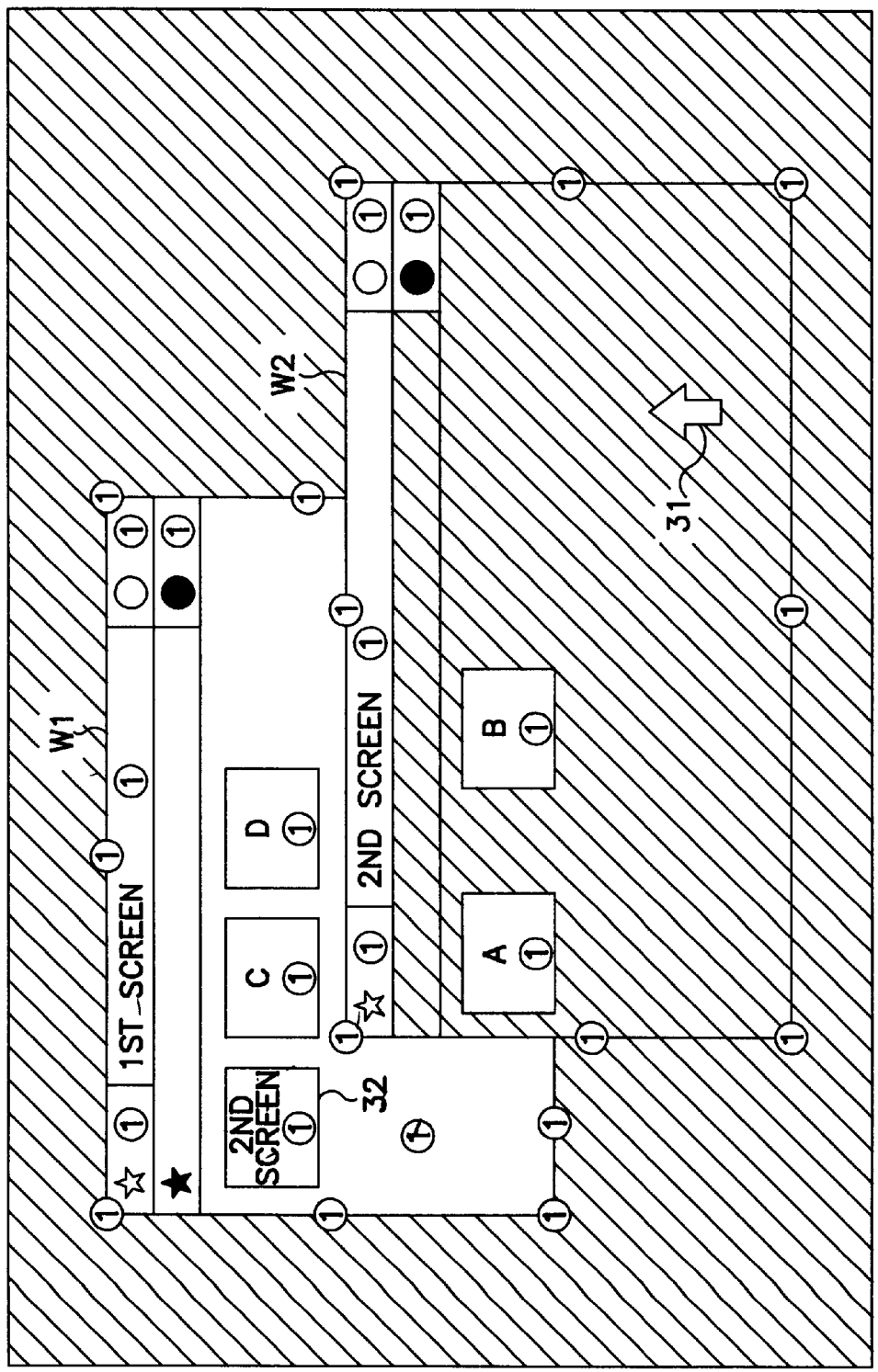
FIG. 7 is a diagram of a screen during the selection process in accordance with the first preferred embodiment of the present invention.

FIG. 7 is a diagram of a screen during the selection process in accordance with the first preferred embodiment of the present invention. Specifically, FIG. 7 shows a practical embodiment for use in an operating system supporting a multiwindow system. FIG. 7 shows a normal display screen of the Windows. In FIG. 7, two windows W1 and W2, respectively, corresponding to the first and second screens, are displayed as half overlapping. Window W2 displays icons A and B while window W1 displays icons C and D and an icon 32 of the second screen.

The symbol ① indicates a reactive area. When a mouse cursor 31 is positioned on a reactive area and the mouse button is clicked, a registered corresponding process is performed. The term reactive area need not always refer to an icon, but, may also refer to an area encompassed by the frame line, corner (vertex), ruled line of the window. The shadowed areas in FIG. 7 indicate an unreactive area which is conventionally not reactive with a clicking operation.

Figure 8:
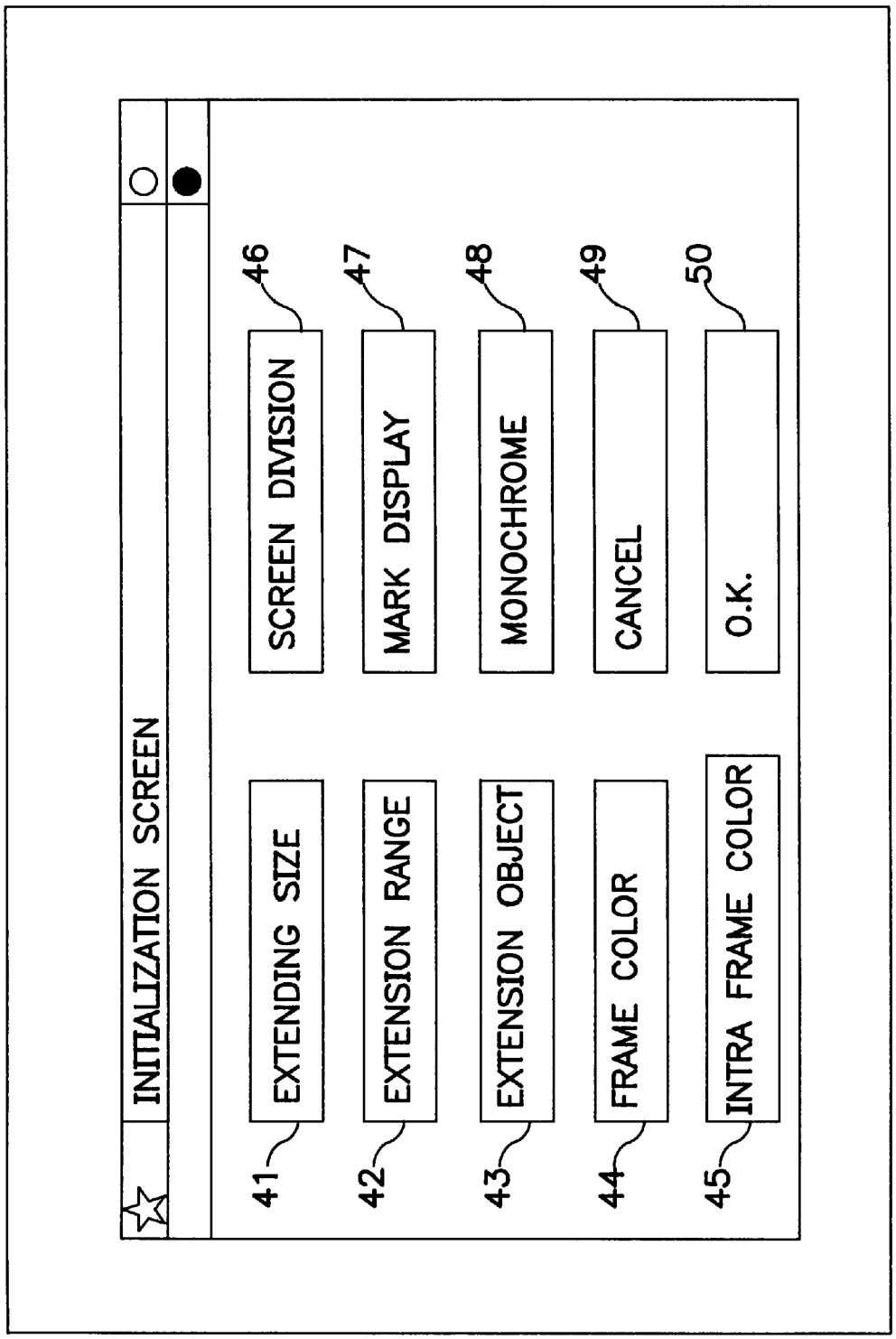
FIG. 8 is a diagram of an initialization screen during the selection process in accordance with the first preferred embodiment of the present invention.

FIG. 8 is a diagram of an initialization screen during the selection process in accordance with the first preferred embodiment of the present invention. When an area marked with a ★ in window W1 (see FIG. 7) is specified by a mouse, an initialization screen on which optional functions of the reactive area extending apparatus are set is displayed. FIG. 8 shows various examples of selection buttons corresponding to respective optional functions.

When an extended size setting 41 is selected, the size of an extended reactive area can be specified. If an extension range setting 42 is selected, the range relative to the original reactive area can be specified. For example, an extension range can be: only the inside of a window containing the original reactive area; only the outside of the window; or either the inside or outside of the window.

When an extension object setting 43 is selected, an object reactive area to be extended can be specified from among the displayed reactive areas. For example, only the reactive area closest to the position of the mouse cursor 31 can be specified as an object reactive area to be extended. Alternatively, all reactive areas in the window in which the mouse cursor 31 is positioned can be specified. Furthermore, all displayed reactive areas can be specified as object reactive areas to be extended.

If an extension frame color setting 44 is selected, a display color of the outline of the extended portion can be specified. When an intraextension frame color setting 45 is selected, a display color of the inside of the extended portion can be specified.

If a screen division setting 46 is selected, a divided screen display can be specified. If a mark display setting 47 is selected, a trimming of a mark to an extended portion can be specified. Practical examples of a divided screen and a trimming display are described later.

If a monochrome processing 48 is selected, an extended portion can be selectively displayed as distinguished by a color shading level or displayed exclusively in monochrome. Furthermore, various settings including the relative position between the original reactive area and extended portion can be provided for an extended display.

Each of the optional functions is preliminarily assigned a default value to be used when the initial setting is omitted. If a cancel 49 is selected on the initialization screen, the settings are cancelled and the previous settings or default settings are effective. When a decision, or OK, 50 is selected, the settings are effective and the corresponding optional functions are altered based on the set values.

A case in which a selection instruction is issued when the preferred default values are selected in step S2 shown in FIG. 6 will hereinafter be described. As shown in FIG. 7, if any of the reactive areas indicated by ① is specified by a mouse, then the determination result in step S3 is YES, the determination result in step S4 is NO, and the determination result in step S5 is YES, thereby performing a process corresponding to a specified reactive area in step S10.

Figure 9:
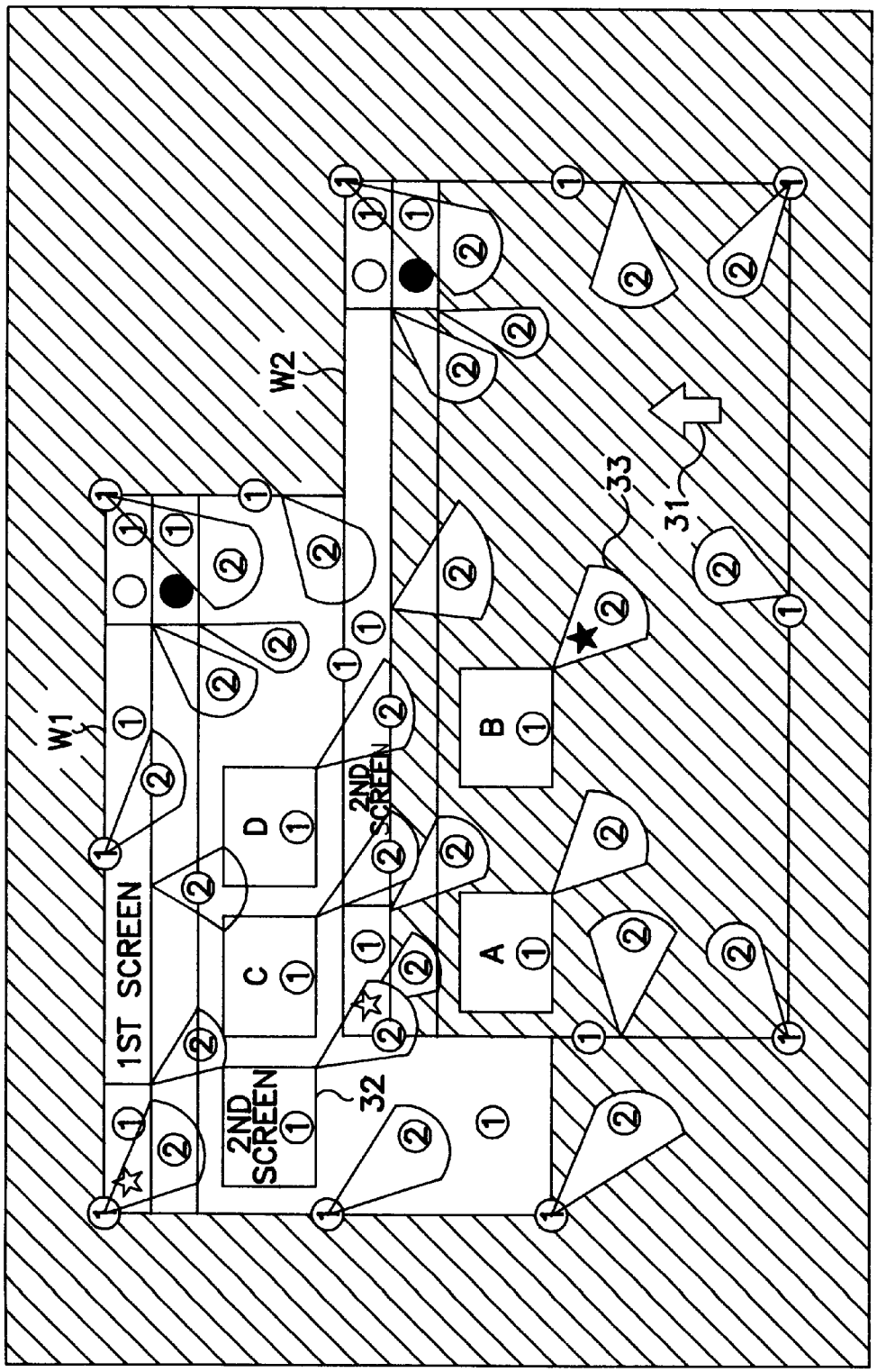
FIG. 9 is a diagram of a screen showing an extended reactive area in accordance with the first preferred embodiment of the present invention.

When the shadowed area shown in FIG. 7 is specified by the mouse, the determination result in step 5 is NO, and an extended sector portion, indicated by a ②, is added to all reactive areas displayed on the screen as sown in FIG. 9, and the added area is displayed in a semitransparent color in step S6.

Figure 10:
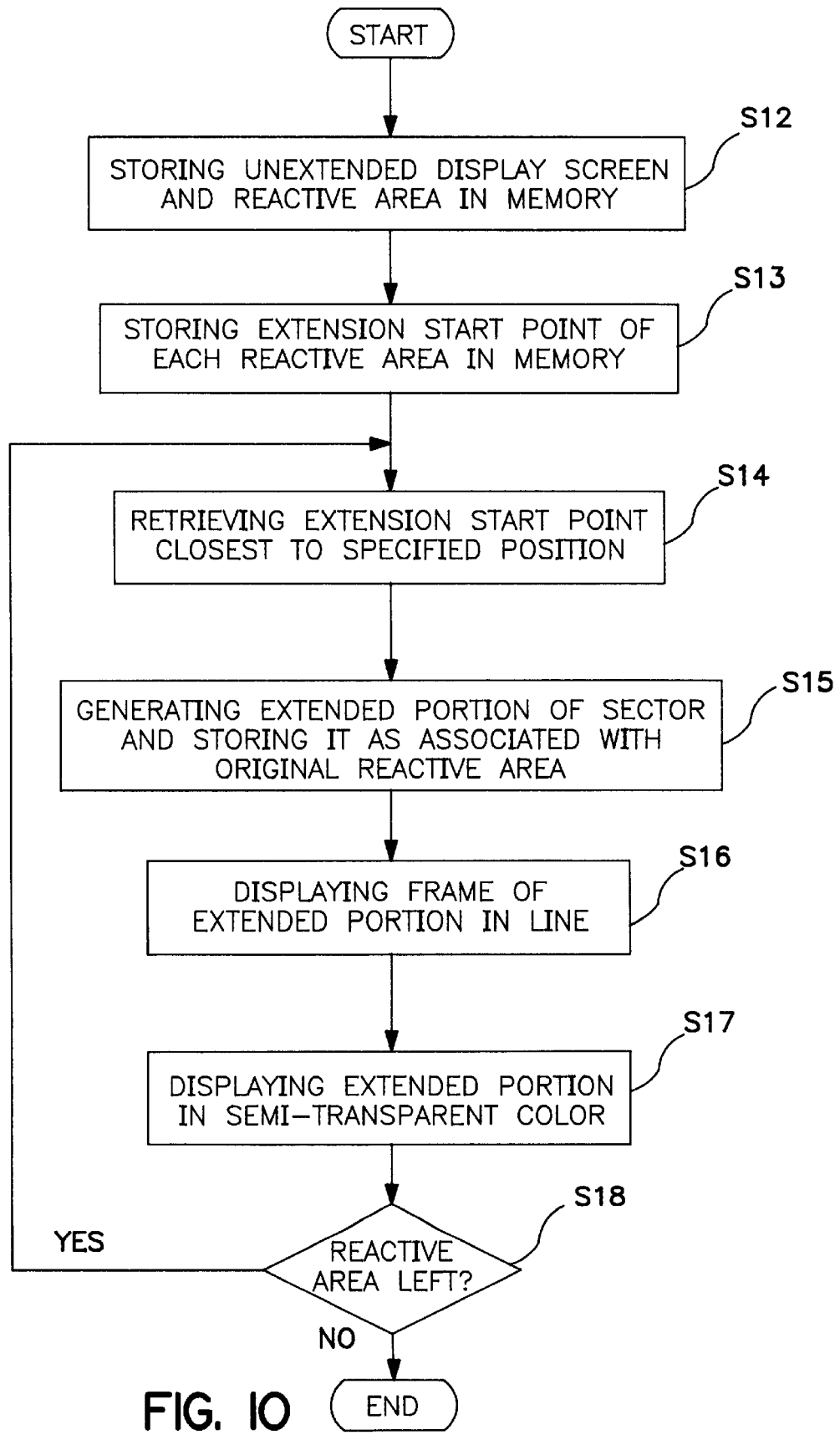
FIG. 10 is a flow chart for a reactive area extending process in accordance with the first preferred embodiment of the present invention.

FIG. 10 is a flow chart for a reactive area extending process in accordance with the first preferred embodiment of the present invention. Specifically, FIG. 10 details step S6 shown in FIG. 6. When the process starts as shown in FIG. 10, the CPU 21 first stores an unextended display screen and a reactive area in the memory 22 in step S12.

Then, the CPU 21 compares the distance from each of a plurality of reference points on the outlines of each of the reactive areas to a point indicated by a position of the mouse cursor 31, determines the reference point having the shortest distance to be an extension start point, and stores the location of the reference point in the memory 22 in step S13. If there are a plurality of patterns indicating the shortest distance to the mouse cursor 31, the first detected reference point of all the plurality of patterns is prioritized. For example, when an icon is rectangular, the four vertices are used as reference points. Next, of the extension start points of the stored reactive areas, the points are sequentially retrieved from the one closest to the mouse cursor 31 in step S14. Control is next passed to steps S15 through S17. If there area a plurality of closest points, then the first detected point is prioritized.

In step S15, a virtual circle having an extension start point as a center and a radius of a predetermined length is generated. A sector extending from the extension start point to the mouse cursor 31 is cut from the circle as an extended portion. The coordinate information representing the area of the extended portion is stored in the memory 22 corresponding to the identification information about the original reactive area. The radius and the central angle are preliminarily set to, for example, 2 cm and 30° respectively. To optionally set these parameters, optional functions can be added on the initialization screen.

If an extended area and an area to be extended overlap, then the latter is extended after nullifying the overlapping area of the former, or visa versa. That is, the extended portion of the latter is overwritten on the extended portion of the former.

In step S16, the outline of the extended portion of a sector is represented by line. If an extended area and an area to be extended overlap, then the line-drawn portion, is displayed after suppressing the display of the former.

In step S17, the inside of the extended portion of the sector is displayed in a semitransparent color. For example, when the gradation of the display color is set in 10 steps, a semitransparent display can be obtained by setting each gradation parameter of the RGB in the extended portion to be +2. In other words, in step S18 a check is made to determine whether there is any unreactive area left. If there are unreactive areas left, the process of steps S14 through S17 are repeated. If the extension of reactive areas is completed, the process terminates. Thus, the extended portion ② of the sector shown in FIG. 9 is additionally displayed.

In step S17, an extended portion can be displayed in an optional color in addition to transparent color, for example, an opaque color, etc. When a transparent color is used, only the outline of the extended portion is represented by lines, and the inside of the outline is displayed in the same color as the background.

When any of the original reactive areas indicated by a ①, as shown in FIG. 9, is specified by the mouse, the determination in step S3, shown in FIG. 6, results in a YES, and the determination in step S4 results in a YES. Of the reactive areas extended and displayed on the screen, the extended portion indicated by a ② becomes an unreactive area, thereby releasing the extended display of the sector in step S7. According to the information stored in step S12 in FIG. 10, the screen display and reactive area before the extension are restored, and the extended display is cancelled. Since a reactive area is selected in step S8, in step SI0 a process corresponding to the specified reactive area is performed as in the conventional method.

When any of the extended portions indicated by a ②, as shown in FIG. 9, is specified by the mouse, the extended display is cancelled as in the case where the area indicated by ① is specified in step S7. However, since an extended portion is selected in step S8, a process is performed to interpret the extended portion as the extended reactive area in step S9 and a process corresponding to the original reactive area is performed in step S10. Since the coordinate information about the extended portion is associated with the original reactive area in the memory 22, the CPU 21 specifies a corresponding reactive area by referring to the information.

For example, when an extended portion 33 shown in FIG. 9 is specified by the mouse, all extended displays are cancelled, and a process associated with the corresponding icon B is performed.

When the shadowed area, as shown in FIG. 9, is specified by the mouse, the determination in step S3 results in a YES, and the determination in step S4 results in a YES. Thus, the extended portion labelled with ② becomes an unreactive area, thereby cancelling the extended display of the sector in step S7. In this case, an unreactive area is selected in step S8, and the state shown in FIG. 7 is restored.

Although the first embodiment of the present invention has been described with respect to a specific configuration, it will be recognized that the first embodiment is not limited to the specific configuration.

Figure 11:
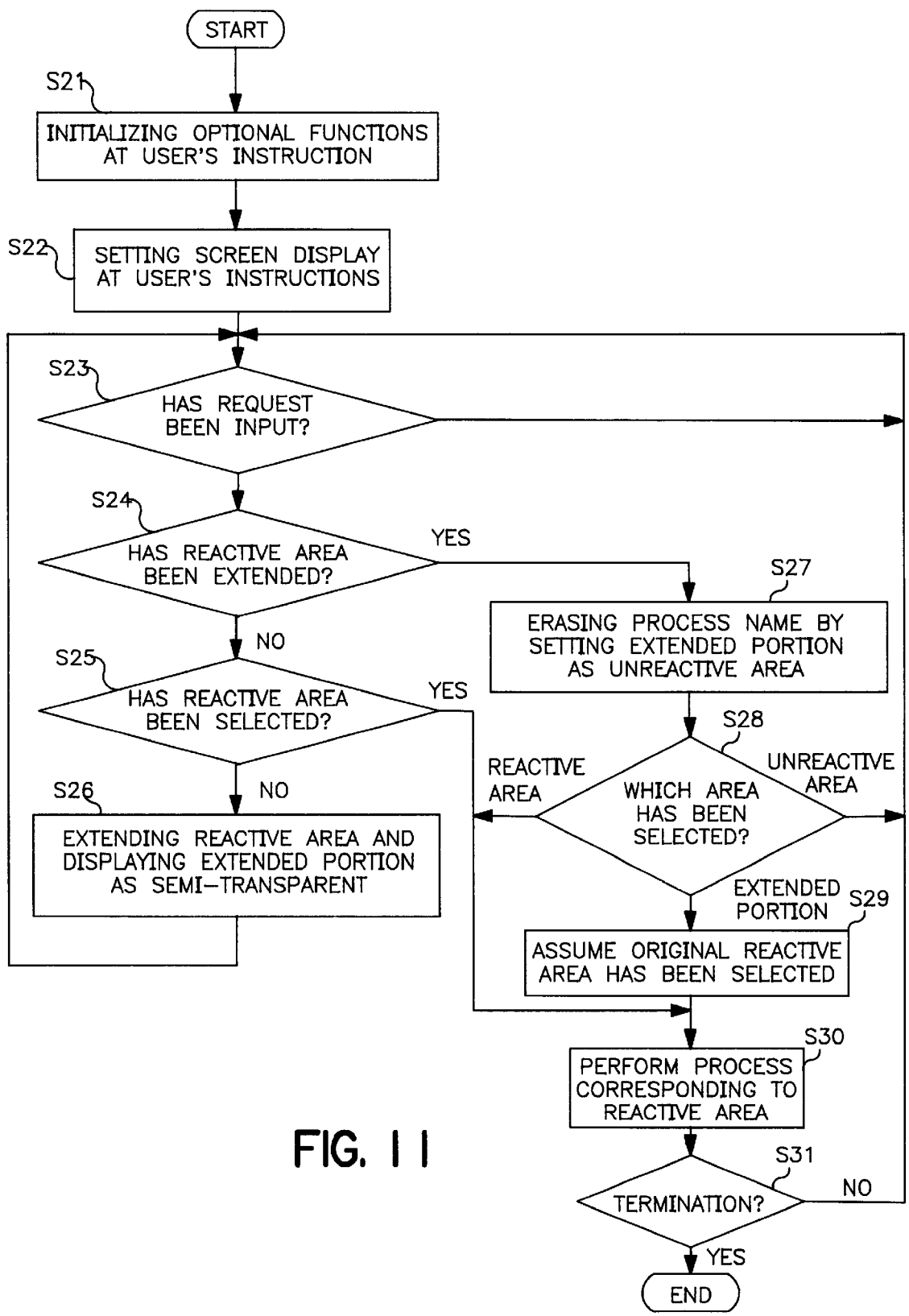
FIG. 11 is a flow chart showing a selecting process in accordance with the second preferred embodiment of the present invention.

FIG. 11 is a flow chart showing a selecting process in accordance with the second preferred embodiment of the present invention. The reactive area selecting process in accordance with the second preferred embodiment of the present invention may be performed on the information processing system shown in FIG. 5. In the second selecting process, the processes in steps S21, S22, S23, S24, S25, S28, S29, S30 and S31 are similar to those in the selecting process according to the second preferred embodiment shown in FIG. 6. Therefore, the descriptions of these processes are omitted here, and the processes in steps S26 and S27 will be described.

If in step S25 a selected area is an unreactive area, the CPU 21 and input/output unit 24 extend all or a part of the reactive areas displayed on the screen, and displays the extended portion with a process name in step S26. A process name refers to identification information, for example textual data, for identifying a registered process corresponding to a reactive area. For example, all or a part of the contents displayed in the original reactive area are used as the process name. Other data indicating the characteristic of the original reactive area can also be used as the process name. The CPU 21 repeatedly performs the processes in and after steps S23.

If it is determined in step S24 that the reactive area has been extended, then the CPU 21 and input/output unit 24 sets the extended portion of the reactive area as an unreactive area, and cancels the extended display and process name in step S27. Control is passed to step S28.

According to the selecting process in accordance with the second preferred embodiment of the present invention, all or a part of the contents of the area can be extended and displayed even if the contents of the displayed reactive area are unclear or cannot be easily recognized. As a result, the contents of an activated process can be easily recognized.

When the mouse specifies the area marked with ★, as shown in FIG. 7, the initialization screen shown in FIG. 8 is displayed and the above described initialization can be performed.

When any of the reactive areas indicated by a ① is specified by the mouse as shown in FIG. 7, the determination in step S23 results in YES, the determination in step S24 results in NO, and the determination in step S25 results in YES. The conventional process corresponding to the specified reactive area is then performed in step S30.

Figure 12:
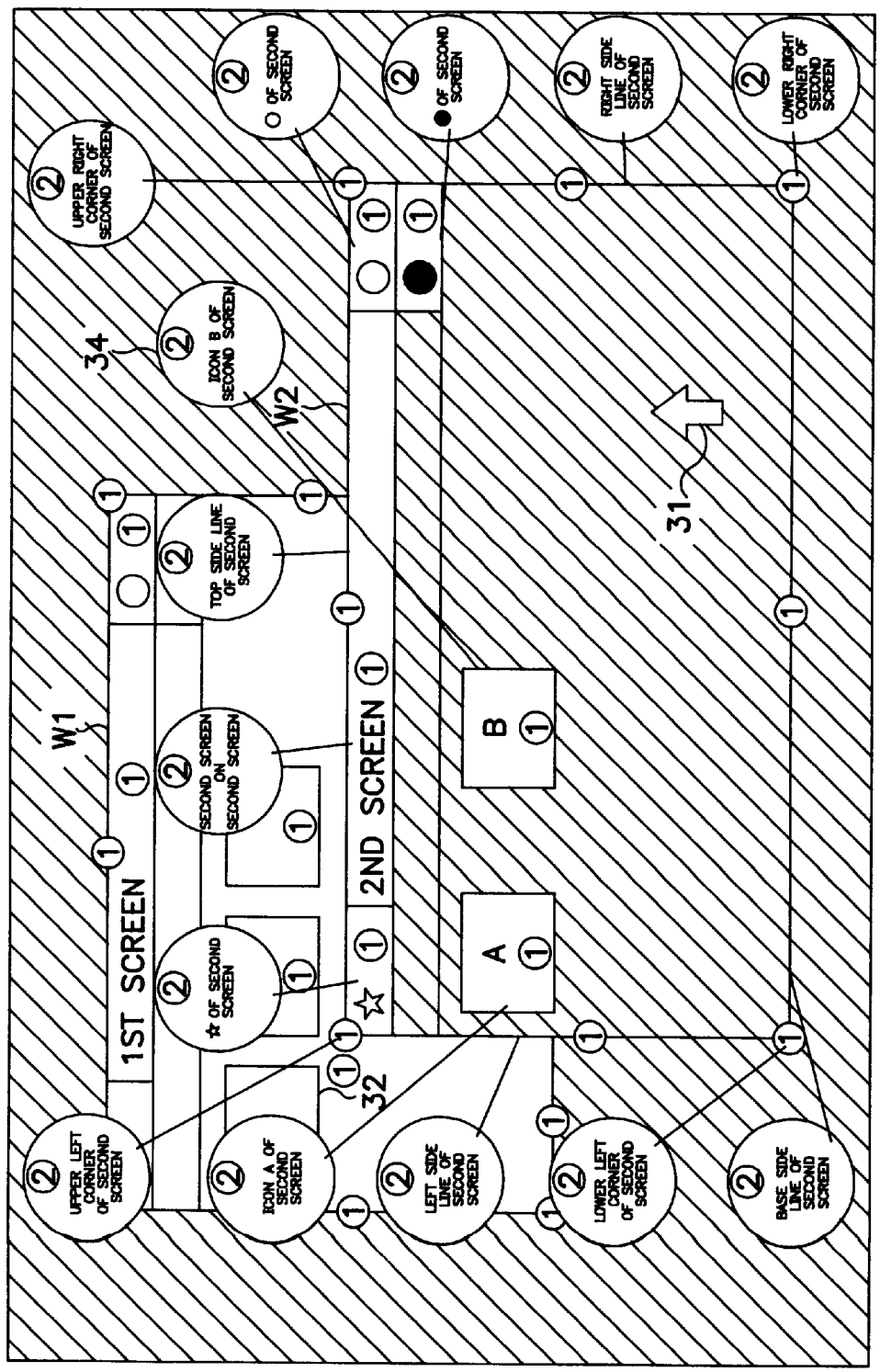
FIG. 12 is a diagram of a display screen in accordance with a second preferred embodiment of the present invention.

FIG. 12 is a diagram of a display screen in accordance with a second preferred embodiment of the present invention. If the shadowed area shown in FIG. 7 is specified by the mouse, the determination in step S25 results in NO, and the extended portion encompassed by the circular outline is added to all reactive areas in window W2 containing the mouse cursor, as shown in FIG. 12, and is displayed in association with the original reactive area. The process name corresponding to the original reactive area is displayed in the outline of the extended portion in step S26.

Figure 13:
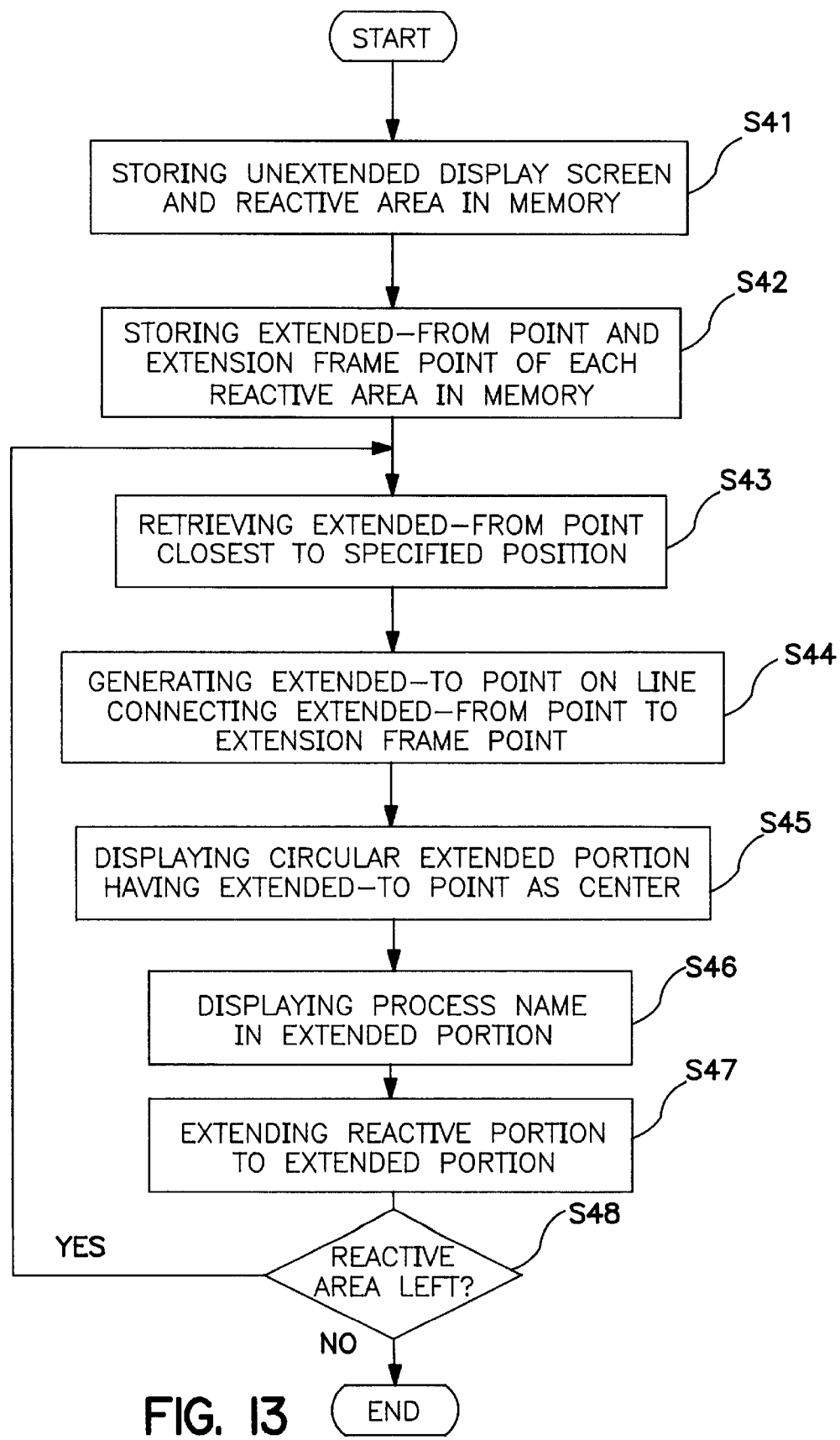
FIG. 13 is a flow chart showing a reactive area extending process in accordance with the second preferred embodiment of the present invention.

FIG. 13 is a flow chart showing a reactive area extending process in accordance with the second preferred embodiment of the present invention. More specifically, FIG. 13 shows an example of a reactive area extending process in step S26 (see FIG. 11). When the process starts as shown in FIG. 13, the CPU 21 first stores the unextended display screen and reactive area in the memory 22 in step S41. Then, the CPU 21 compares the distance from each of a plurality of reference points on the outline of each of the reactive areas in the window containing the mouse cursor 31 to the window frame.

Figure 14:
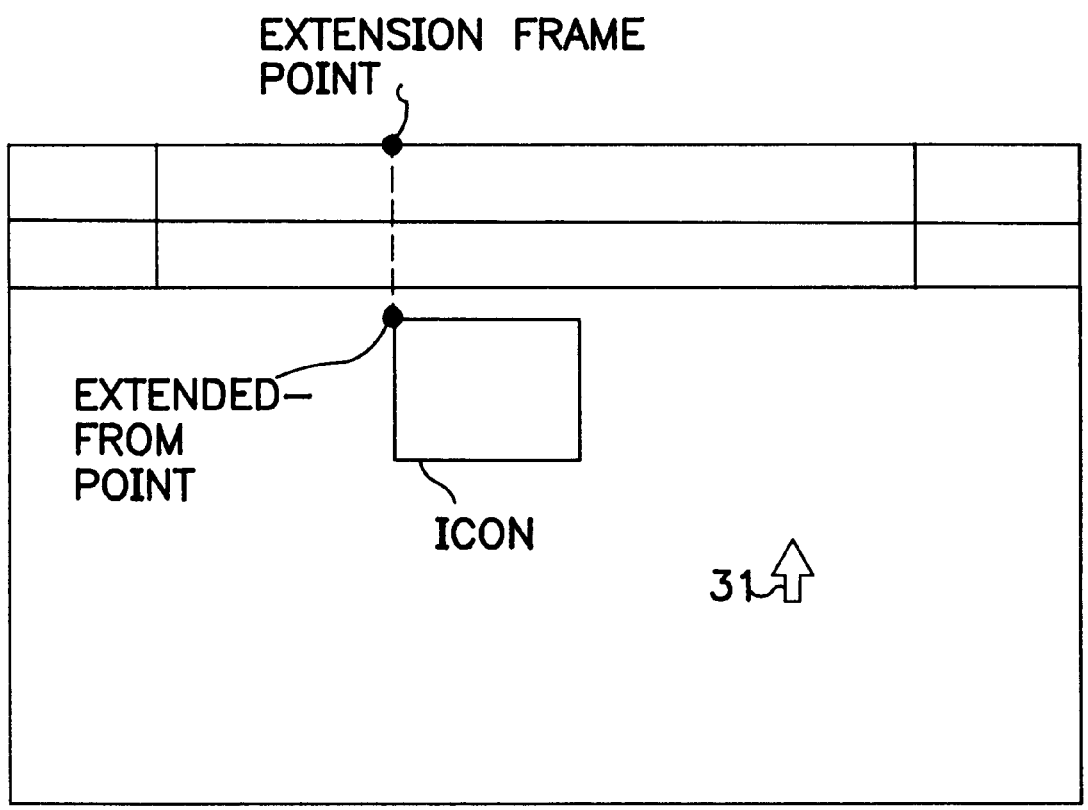
FIG. 14 is a diagram of a window frame.

FIG. 14 is a diagram of a window frame. As shown in FIG. 14, the reference point indicating the shortest distance is defined as an extended-from point and the corresponding point on the window frame is defined as an extension frame point. These points are stored in the memory 22 in step S42.

If there are a plurality of patterns indicating the shortest distance to the mouse cursor 31, the first detected reference point of all the plurality of patterns is prioritized. For example, when an icon is rectangular, the four vertices are used as reference points.

Next, the stored extended-from points of the reactive areas are sequentially retrieved, from the one closest to the mouse cursor 31 in step S43 (see FIG. 13). Control is passed to steps S44 through S46. If there are a plurality of closest points, then the first detected point is prioritized.

Figure 15:
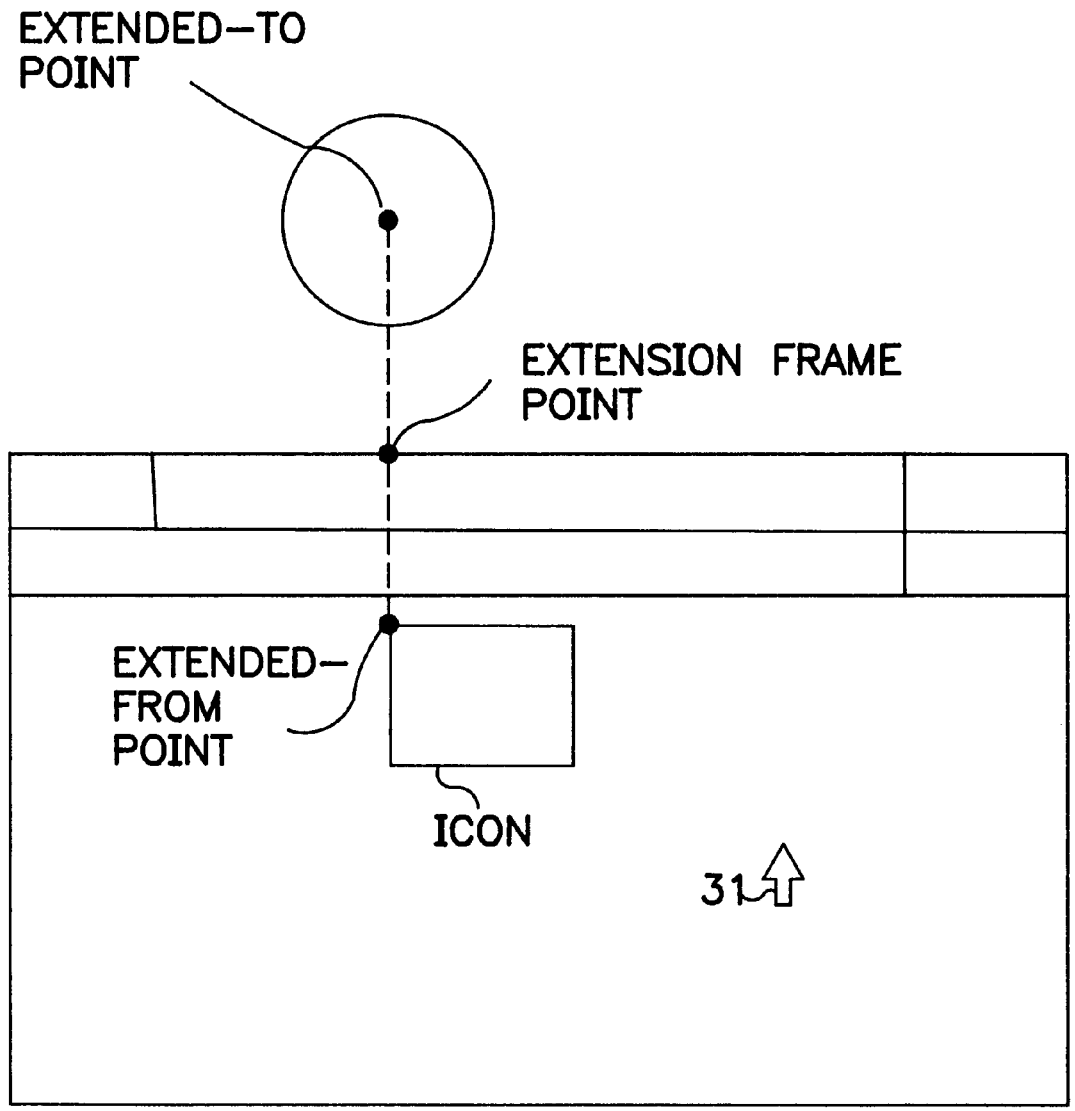
FIG. 15 is a diagram of a window frame.

FIG. 15 is a diagram of a window frame. From the extended-from point to the extension frame point, a line double in length the distance between these points is drawn to the area outside the window in step S44 (see FIG. 13). The end of the line is stored in the memory 22 as an extended-to point.

In step S45, a circle comprising the extended-to point as a center and a radius of a predetermined length is drawn in a line. The inside of the outline of the circle is painted white as an extended portion. At this time, the display position of the circle is adjusted so as to avoid overlapping an already displayed circle. The radius, for example 1.5 cm, of the overlapping circle is predetermined, but can be optionally set on the initialization screen.

In step S46, the process name corresponding to the original reactive area is displayed within the circle comprising the extended-to point as a center. In step S47, the area in the circle is associated with the original reactive area, and the reactive area is extended in the circle. As a result, the circular extended portion becomes reactive with a mouse clicking.

Then, in step S48, it is checked whether or not an area for displaying another circular extended portion is left. If an area on which the circle can be displayed exists, the processes in and after step S43 are repeated for the next point to be extended. If there are no areas left for display, then the extending process terminates. Thus, the circular extended portions ② as shown in FIG. 12 are additionally displayed.

When any of the original reactive areas indicated by a ①, as shown in FIG. 12, is specified by the mouse, the determination in step S23 results in YES, and the determination in step S24 results in YES. Of the reactive areas extended and displayed on the screen, the extended portion indicated by a ② becomes an unreactive area, thereby releasing the extended display of the sector in step S27.

According to the information stored in step S41 in FIG. 13, the screen display and reactive area before the extension are restored, and the extended display is cancelled. Since a reactive area is selected in step S28, a process corresponding to the specified reactive area is performed in step S30.

When any of the extended portions indicated by a ②, as shown in FIG. 12, are specified by the mouse, the extended display is cancelled (as in the case where the area indicated by a ① is specified) in step S27. However, since an extended portion is selected in step S28, a process is performed to interpret it as extended reactive area in step S29 and a process corresponding to the original reactive area is performed in step S30. For example, when an extended portion 34 shown in FIG. 12 is specified by the mouse, all extended displays are cancelled, and a process corresponding to the icon B is performed.

When the shadowed area is specified by the mouse as shown in FIG. 12, the determination in step S23 results in YES, and the determination in step S24 results in YES. Thus, the extended portion shown by a ② becomes an unreactive area, thereby cancelling the extended display of the sector in step S27. In this case, an unreactive area is selected in step S28, and the state in FIG. 7 is restored with the next input expected.

Although the second embodiment of the present invention has been described with respect to a specific configuration, it will be recognized that the second embodiment is not limited to the specific configuration.

If the screen dividing function is specified by the screen division setting 46 on the initialization screen, as shown in FIG. 8, the CPU 21 sets a part of the display screen as an unreactive area in the extending process, and uses it as an area for displaying the extended portion. For example, in step S6, in FIG. 6 or in step S26 in FIG. 11, the CPU 21 divides the display screen vertically or horizontally at a predetermined ratio. The area farthermost from the position of the mouse cursor 31 is selected from the generated divided screen areas and set as an unreactive area. Thus, the extended portion is displayed in the newly-generated unreactive area.

At this time, the number of reactive areas to be extended or the area of the extended portion is computed. A check is made to determine whether the obtained value exceeds a predetermined reference value. The reactive area is extended within the range of the reference value. The reference value is determined from the area of a divided screen for use in displaying an extended portion. In step S7, shown in FIG. 6, or in step S27, shown in FIG. 11, the CPU 21 cancels an extended display, releases a screen division, and cancels a divided screen used for display of an extended portion.

Figure 16:
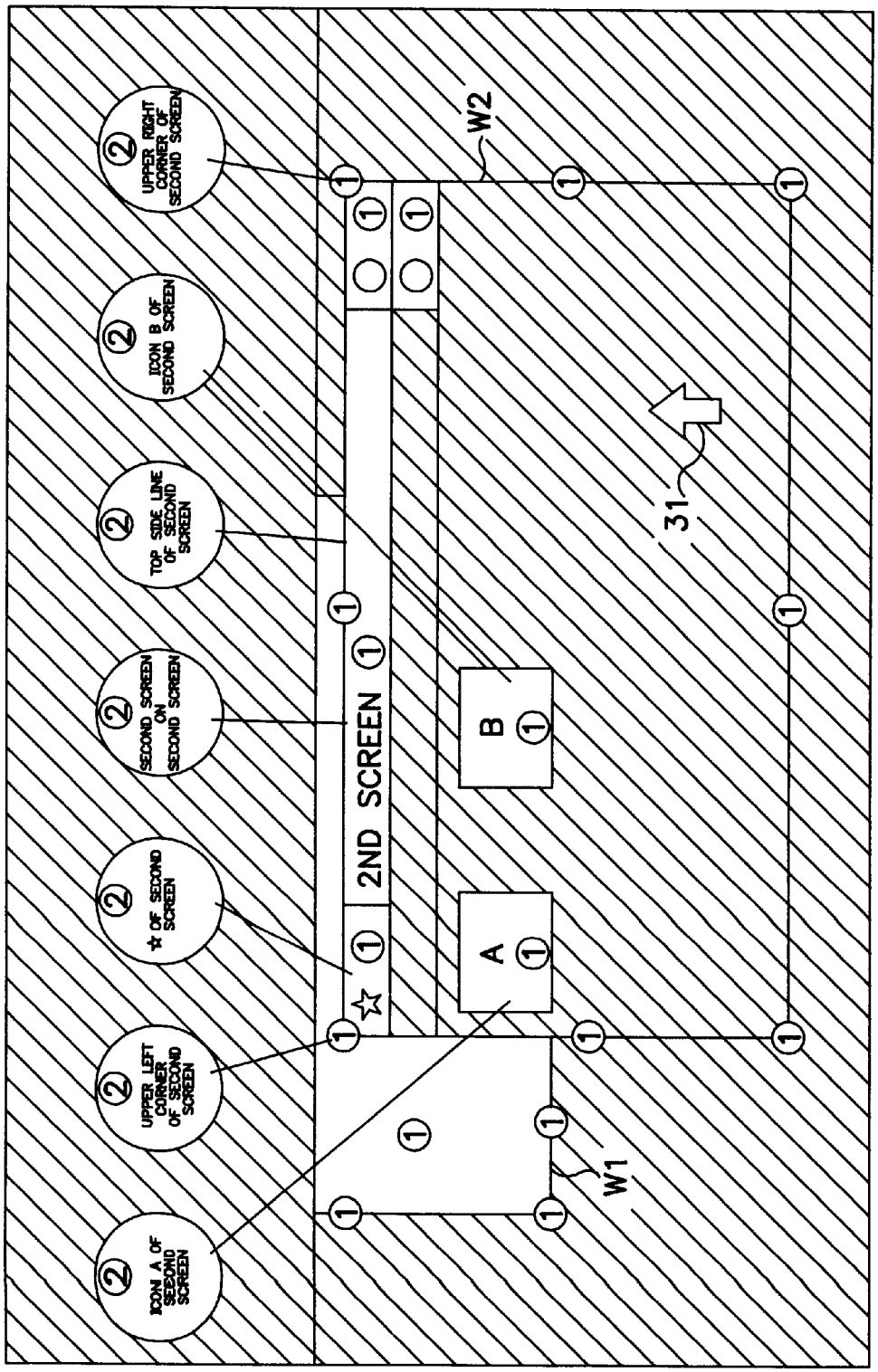
FIG. 16 is a diagram showing a screen display.

FIG. 16 is a diagram showing a screen display. Specifically, FIG. 16 shows an example of dividing the screen shown in FIG. 7. In FIG. 16, the screen is divided into two screen portions, that is, an upper screen portion and a lower screen portion. The upper screen portion displays the extended portions corresponding to some reactive areas of window W2. The extended portions are displayed with respective process names.

If a mark displaying function is specified by the mark display setting 47 on the initialization screen, shown in FIG. 8, the CPU 21 displays all or a part of the reactive areas displayed on the screen in the extending process with marks added to the reactive areas. For example, in step S6, shown in FIG. 6, or in step S26, shown in FIG. 11, the CPU 21 displays the extended portion with a mark added to it, and cancels the extended display and the marked display in step S7 or S27. The user can optionally set the shape, color, position, etc. of the mark.

Figure 17:
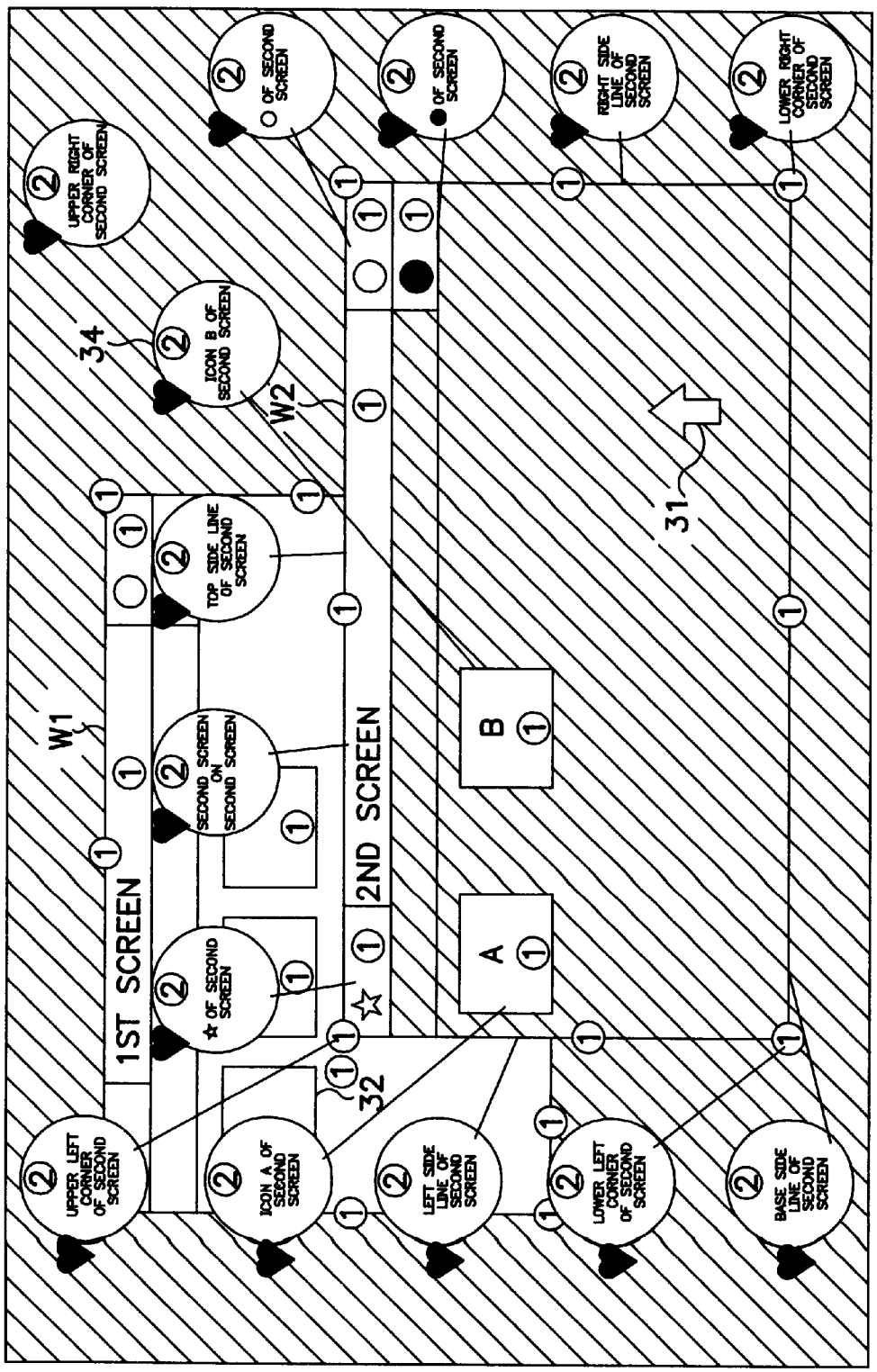
FIG. 17 is a diagram showing a screen display.

FIG. 17 is a diagram showing a screen display. Specifically, FIG. 17 shows an example of a mark added to the extended portion shown in FIG. 12. In FIG. 17, a heart-shaped mark is added to the extended portion corresponding to each reactive area in window W2. Thus, the location of the area to be specified can be immediately recognized by adding a mark to an extended reactive area. Since a reactive area is easily recognized by simply specifying a marking option, it is not required to always specify the extended display. The marked display may replace the extended display.

In this case, in step S4, shown in FIG. 6 or in step S24, shown in FIG. 11, the CPU 21 determines whether a mark has already been assigned to the reactive area on the screen, and displays a mark instead of extending the reactive area. In step S7 or S27, the mark is removed.

Although a few preferred embodiments of the present invention have been shown and described, it would be appreciated by those skilled in the art that changes may be made in these embodiments without departing from the principles and spirit of the invention, the scope of which is defined in the claims and their equivalents. For example, in the above described embodiments, the shape of the extended portion of a reactive area is sectorial or circular. However, it is obvious that an extended portion can be displayed in any other shape. The display color of the extended portion can also be optionally specified, not limited to a white, semi-transparent color, etc. The extended portion can also be generated in a way that it encompasses the original reactive area as shown in FIGS. 2, 3 and 4 or such that it extends from the original reactive area in a predetermined direction as shown in FIGS. 9 and 12. In accordance with the preferred embodiments, the extended display is cancelled when an extended reactive area is selected. However, the extended display can also be cancelled when a predetermined operation is performed.

According to the present invention, a desired selection item is selected from among the selection items on the screen. An area can be extended and displayed using an input unit such as pointing devices, etc. thereby allowing an instructing operation to be easily performed. By extending and displaying areas, it is easier to recognize what areas are and where they are, thereby making it easy to find out an object reactive area from among a number of areas such as icons. If the system has the extended display capabilities, the reactive area can be preliminarily reduced and displayed, thereby increasing the amount of data simultaneously displayed on a single screen.

What is claimed is:

1. An information processing apparatus comprising:
   a screen displaying reactive areas and non-reactive areas;
   input means for inputting position information about a position on said screen as specified by a user with click or other equivalent operation;
   determining means for determining whether the position corresponds to one of a reactive area and an unreactive area;
   extending means for extending at least one reactive area by designating an extended portion corresponding to the at least one reactive area when the position corresponds to an unreactive area; and
   displaying means for displaying on said screen the extended portion of the at least one reactive area.

2. The apparatus according to claim 1, wherein said input means comprises a pointing device for pointing to a position on said display screen.

3. The apparatus according to claim 1, wherein said extending means extends a reactive area corresponding to a selection item on said screen.

4. The apparatus according to claim 1, wherein said display means displays a plurality of process windows on the screen; and said extending means extends an optional reactive area belonging to one of the process windows containing the position.

5. The apparatus according to claim 1, wherein said extending means extends all of the reactive areas displayed on the screen.

6. The apparatus according to claim 1, wherein said display means displays the extended portion using one of a transparent, semitransparent, and opaque color.

7. The apparatus according to claim 1, further comprising:
   storage means for storing area information about the extended portion and reactive area.

8. The apparatus according to claim 1, further comprising:
   erasing means for erasing the extended portion from the screen.

9. The apparatus according to claim 8, wherein said determining means determines whether a reactive area is extended; and said erasing means erases the extended portion of the reactive area when additional position information is inputted after the reactive area has been extended.

10. The apparatus according to claim 1, further comprising:
  storage means for storing identification information for identifying a process corresponding to a reactive area; and
  wherein said display means displays the identification information in conjunction with the extended portion.

11. The apparatus according to claim 10, further comprising:
  erasing means for erasing the extended portion and the identification information from said screen.

12. The apparatus according to claim 1, wherein said display means displays a mark indicating a display position of the extended portion.

13. An information processing apparatus comprising:
  a screen displaying reactive areas and non-reactive areas;
  input means for inputting position information about a position specified by a user on said screen;
  determining means for determining whether the position corresponds to one of a reactive area and an unreactive area;
  extending means for extending at least one reactive area by designating an extended portion corresponding to the at least one reactive area when the position corresponds to an unreactive area, said extending means counts a number of reactive areas extended on said screen, and suppresses extending a new reactive area when a count value exceeds a predetermined value; and
  displaying means for displaying on said screen the extended portion of the at least one reactive area.

14. The apparatus according to claim 1, wherein said display means displays the extended portion in a predetermined area on said screen.

15. An information processing apparatus comprising:
  a screen displaying reactive areas and non-reactive areas;
  input means for inputting position information about a position specified by a user on said screen;
  determining means for determining whether the position corresponds to one of a reactive area and an unreactive area;
  extending means for extending at least one reactive area by designating an extended portion corresponding to the at least one reactive area when the position corresponds to an unreactive area; and
  displaying means for displaying on said screen the extended portion of the at least one reactive area in a predetermined area on said screen, wherein said screen is one of vertically and horizontally divided to form two areas and one area is selected as the predetermined area.

16. The apparatus according to claim 15, wherein the selected divided area does not contain the position.

17. The apparatus according to claim 15, further comprising:
  erasing means for erasing the extended portion from the screen and releasing the division of the screen.

18. An information processing apparatus comprising:
  a screen display displaying a plurality of process selection items;
  input means for inputting position information about a position on said screen as specified by a user with a click or other equivalent operation;
  determining means for determining whether the position corresponds to one of the process selection items;
  extending means for extending at least one process selection item by designating an extended portion corresponding to the at least one process selection item when the specified portion does not correspond to a selection item; and
  display means for displaying on said screen the extended portion of the at least one selection item in association with the at least one selection item.

19. An information processing apparatus comprising:
  input means for inputting position information about a position on said screen as specified by a user with a click or other equivalent operation;
  determining means for determining whether the position corresponds to one of a reactive area and an unreactive area; and
  display means for adding a mark to and displaying an optional reactive area on the screen when the position corresponds to an unreactive area.

20. The apparatus according to claim 19, further comprising erasing means for erasing the mark from the screen.

21. An information processing apparatus comprising:
  input means for inputting position information about a position specified by a user on said screen;
  determining means for determining whether the position corresponds to one of a reactive area and an unreactive area and whether a mark has been added to the reactive area; and
  display means for adding a mark to and displaying an optional reactive area on the screen when the position corresponds to an unreactive area; and
  erasing means for erasing the mark from the screen, wherein said erasing means erases the mark when additional position information is input after the mark has been added.

22. A computer program on a computer-readable storage medium for controlling a screen of a general purpose computer having reactive areas and unreactive areas, comprising:
  receiving position information about a position on the screen as specified by a user with a click or other equivalent operation;
  determining whether the position corresponds to one of a reactive area and an unreactive area;
  generating an extended reactive area corresponding to a reactive area when the specified position corresponds to an unreactive area; and
  displaying on the screen the extended reactive area in association with the reactive area.

23. A computer program on a computer-readable storage medium for controlling the display of a plurality of process selection items on a screen of a general purpose computer comprising:
  receiving position information about a position on the screen as specified by a user with a click or other equivalent operation;
  determining whether the position corresponds to one of the process selection items;
  generating an optional reactive area when the position does not correspond to any selection items; and
  displaying on the screen the optional reactive area in association with a process selection item.

24. A method of extending a reactive area, comprising the steps of:

displaying a plurality of process selection items having related reactive areas on a screen;

inputting position information about a position on the screen as specified by a user with a click or other equivalent operation;

determining whether the position corresponds to one of a reactive area or an unreactive area;

generating an optional reactive area related to a reactive area when the specified area corresponds to an unreactive area; and displaying on the screen the optional reactive area in association with the reactive area.

25. A method of extending a reactive area, comprising the steps of:

displaying a plurality of process selection items on a screen;

inputting position information about a position on the screen as specified by a user with a click or other equivalent operation;

determining whether the position corresponds to one of the process selection items;

generating an optional reactive area corresponding to a process selection item when the specified area does not correspond to any selection items; and displaying on the screen the optional reactive area in association with the process selection item.

* * * * *